PLATFORM ELEVATION CONTROL MECHANISM

Original Filed Aug. 22, 1967 3 Sheets-Sheet 1

INVENTORS
MALCOLM T. PHELPS
CARL H. LITTLE
BY
Bean, Brooks, Buckley & Bean
ATTORNEYS

PLATFORM ELEVATION CONTROL MECHANISM

Original Filed Aug. 22, 1967 3 Sheets-Sheet 2

INVENTORS
MALCOLM T. PHELPS
CARL H. LITTLE
BY
Bean, Brooks, Buckley & Bean
ATTORNEYS PLATFORM ELEVATION CONTROL MECHANISM
Original Filed Aug. 22, 1967 3 Sheets-Sheet 3
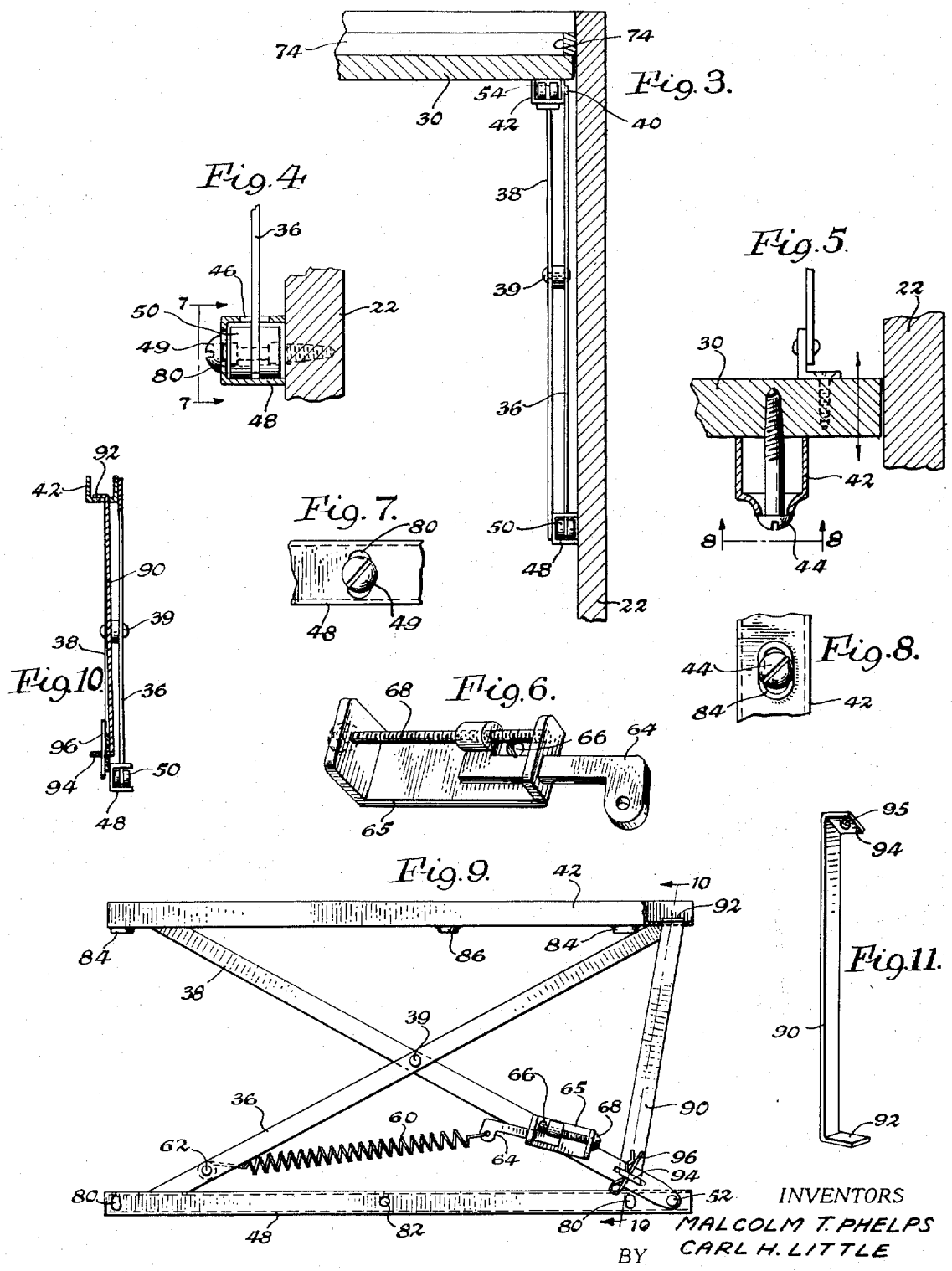
INVENTORS
MALCOLM T. PHELPS
CARL H. LITTLE
BY
Bean, Brooks, Buckley + Bean
ATTORNEYS United States Patent Office Re. 27,558
Reissued Jan. 23, 1973

27,558

PLATFORM ELEVATION CONTROL MECHANISM

Malcolm T. Phelps and Carl H. Little, Jamestown, N.Y., assignors to Weber-Knapp Company, Jamestown, N.Y.

Original No. 3,431,040, dated Mar. 4, 1969, Ser. No. 662,405, Aug. 22, 1967. Application for reissue Apr. 23, 1969, Ser. No. 822,071
Int. Cl. A47b *97/00, 81/00;* C11b *1/00*
U.S. Cl. 312—272 9 Claims

Matter enclosed in heavy brackets [ ] appears in the original patent but forms no part of this reissue specification; matter printed in italics indicates the additions made by reissue.

ABSTRACT OF THE DISCLOSURE

An improved platform elevation control mechanism which is particularly adapted to control the raising and lowering of a platform in a record player cabinet or the like wherein the cabinet includes a swinging top cover or lid and wherein the platform carries the weight of the record player mechanism and records, and other accessories such as the tuner, amplifier, etc.; and wherein the platform rises and lowers in response to manual movements of the cabinet cover.

Summary of invention

The present invention relates to an improved control mechanism adapted to position a record player mechanism supporting platform within a cabinet for vertical movement from a relatively inaccessible, submerged position within the cabinet upwardly into an elevated, readily accessible position, upon manual raising of a cabinet top cover or lid.

More specifically, the control mechanism according to the present invention includes top and bottom guide rails, adapted to be affixed respectively to the bottom surface of the platform and an inside vertical side wall of the cabinet and cooperate therewith to provide closed trackways interiorly of the rails; a pair of struts pivotally interconnected intermediate their lengths, the upper end of a first of the struts being pivotally connected to one end of the upper rail and the lower end of a second of the struts being pivotally connected to a corresponding end of the lower rail, the other ends of the first and second struts having roller members slide-fitted through apertured wall portions of the bottom and top rails respectively; and means including a bracket and a tension spring interconnecting the struts which is adjustable to substantially counter-balance the weight of the platform and accouterments thereof.

By providing a control mechanism having the foregoing structure and forming the top and bottom rails so as to permit the ready adjustment thereof with respect to the bottom surface of the platform and an inside vertical wall of the cabinet, respectively, it is now possible to accurately position the platform within the cabinet regardless of errors in cabinet construction.

Further the present invention anticipates the provision of a detachable tool to maintain the control mechanism in its most compact overall form in order to permit the mechanisms to be readily fabricated as complete subassemblies and locked in compacted form for transport and storage or other handling preliminary to their installation in a cabinet.

Description of the invention

The invention is hereinafter described and illustrated by way of example in the accompanying drawing, wherein:

FIG. 3 is a fragmentary sectional view taken as suggested by line 3—3 of FIG. 2;

FIG. 4 is a fragmentary sectional view on enlarged scale, taken as suggested by line 4—4 in FIG. 2;

FIG. 5 is a fragmentary sectional view on enlarged scale, taken as suggested by line 5—5 of FIG. 2;

FIG. 6 is a disassembled perspective view of an operational control adjustment portion of the mechanism;

FIG. 7 is a fragmentary sectional view taken as suggested by line 7—7 of FIG. 4;

FIG. 8 is a fragmentary sectional view taken as suggested by line 8—8 of FIG. 5;

FIG. 9 is a disassembled side elevational view of the platform motion control mechanism shown at the left hand side of the cabinet in FIG. 1, when in retracted condition and incidental to installation of the mechanism in a cabinet.

FIG. 10 is a sectional view taken as suggested by line 10—10 of FIG. 9; and

FIG. 11 is a disassembled perspective view of a special tool for facilitating installation of the mechanism of the invention in a cabinet.

Figure 1:
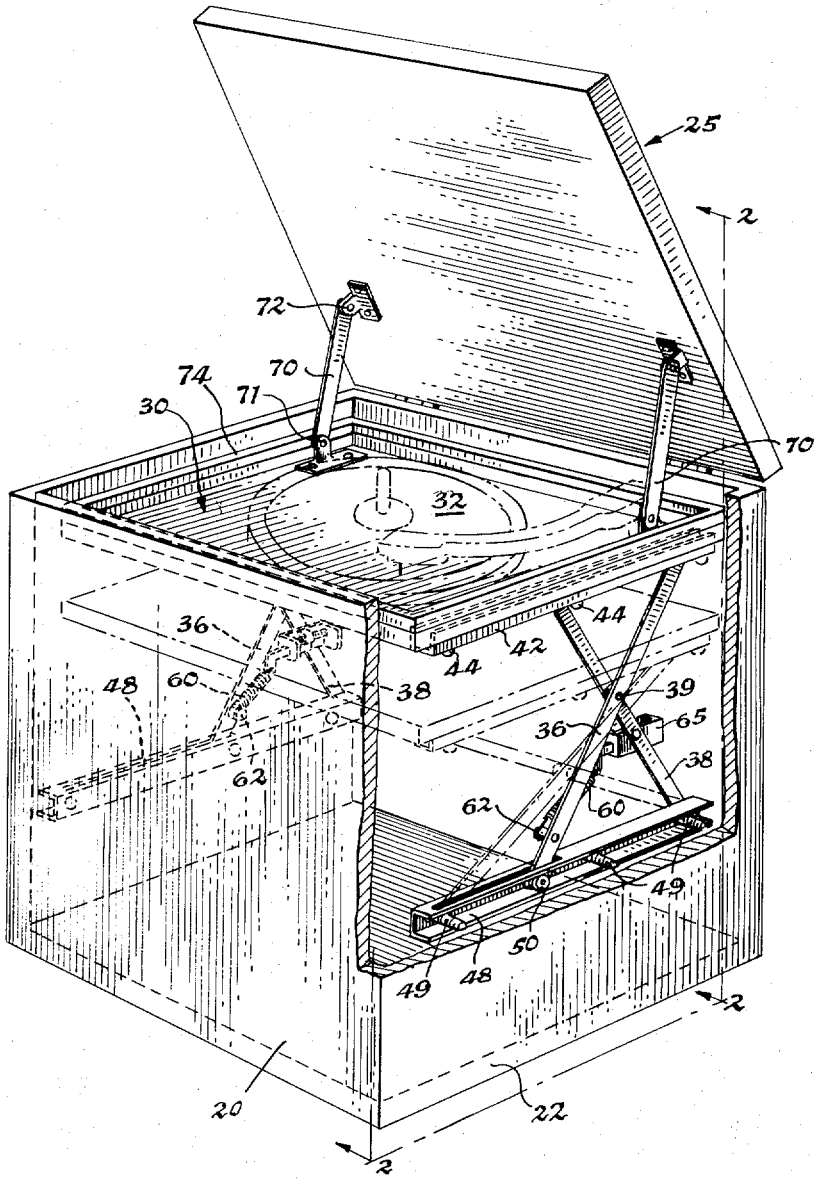
FIG. 1 is a perspective view of a record player cabinet embodying a vertically moving platform and control mechanism therefor in accordance with the invention; portions of the cabinet being broken away to show the control mechanism.

As shown by way of example herein, the invention is illustrated in conjunction with an open top type record player cabinet comprising front and rear walls 20, 21; opposite side walls 22—22; a bottom plate 24; and a top cover 25 which is hingedly connected as indicated at 26 (FIG. 2) to the upper edge of the rear wall structure 21. A turntable and drive mechanism supporting platform is disposed interiorly of the cabinet as indicated at 30 which carries the record player turntable as indicated at 32 (FIGS. 1, 2) and the turntable drive motor system as indicated generally at 34 (FIG. 2).

The platform 30 is vertically supported and motion-guided by means of a pair of improved combination weight counterbalance and parallel motion mechanisms each of which as shown in the drawing herewith comprises a pair of struts 36, 38, which are cross-pivoted as indicated at 39. The strut 36 is pivotally connected at its upper end as indicated at 40 to a side flange portion of an upwardly facing channel-sectional rail 42 which is fixed to the underside of the platform 30 as by means of screws 44. The lower end of the strut 36 slide-fits through a slotted portion 46 (FIG. 4) of the top flange of a sidewise facing channel-sectioned bottom rail member 48 which is fixed to the corresponding inner surface of the cabinet side wall 22 as by means of screws 49. At its lower end strut 36 carries a roller 50 which rides within the trackway defined by the interior of the bottom rail 48. The strut 38 is pivoted as indicated at 52 to the opposite end of the bottom rail 48, and the upper end of the strut 38 extends through a slotted bottom wall portion of the upper rail 42 and carries therewithin a roller 54 which thereby runs within the guideway defined by the interior of the upper rail and the bottom surface of the platform 30. Thus it will be appreciated that the upper rail may move vertically with respect to the bottom rail while being at all times maintained in exact parallelism with the bottom rail; the free ends of the struts being so guided by the rollers 50, 54, running inside the guide rails as to at all time forcibly maintain the strucure to maintain this relation regardless of the elevation of the top rail relative to the bottom rail.

Therefore, as shown in the drawing herewith, when the turntable platform 30 is disposed horizontally within the interior of the cabinet and supported at its opposite sides by means of a pair of the above described parallel motion units, the platform is thereby supported for vertical movement within the cabinet while at all times remaining horizontally disposed. To counter-balance the weight of the platform and the weight of the appliances carried thereby, a tension spring as indicated at 60 is supplied in connection with each unit. As illustrated herein, one end of the spring may be anchored as at 62 to the lower end of the strut 36 while at its other end the spring hooks into one end of a blade member 64 which is slidably carried by a bracket 65. The bracket 65 is pivotally attached as indicated at 66 to the strut 38. Thus, it will be appreciated that when the spring 60 is under tension it tends to draw the lower end of the strut 36 over toward the lower end of the strut 38; thereby scissoring the mechanism into a vertically extended condition as shown for example at FIGS. 1 and 2 as compared to the condition illustrated by broken lines in FIGS. 1, 2 and by FIG. 9. To provide for adjustments of the spring tension so as to attain the desired counterbalancing action, the blades 64 are threadedly engaged by screws 68 which are rotatably held on the brackets 65, whereby screw driver adjustments of the screws will provide the desired counterbalancing action.

Figure 2:
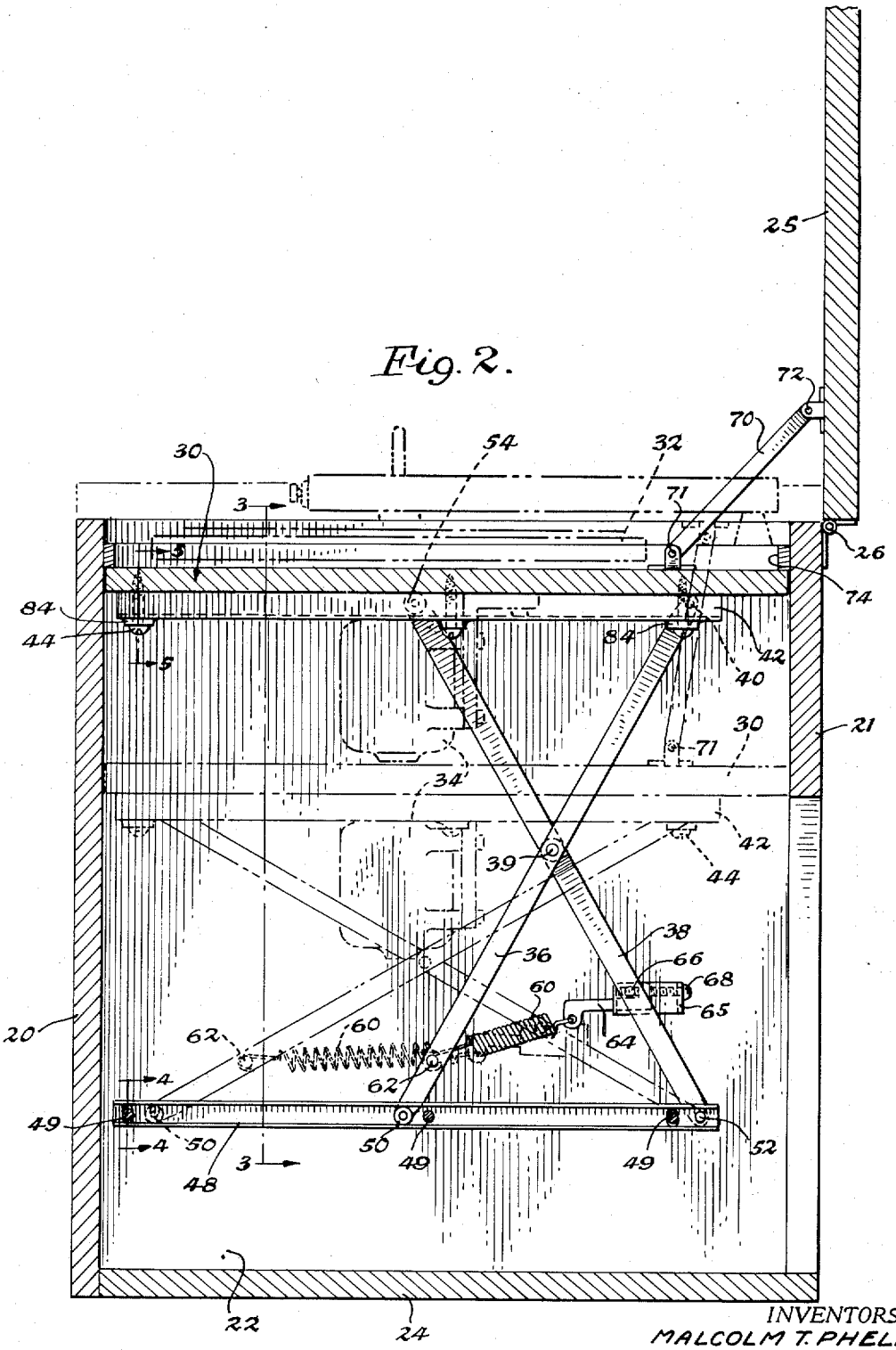
FIG. 2 is an enlarged scale sectional view taken as suggested by line 2—2 of FIG. 1, but showing the cabinet cover and turntable supporting platform in fully raised positions.

As shown in FIGS. 1 and 2, the mechanism of the invention is particularly adaptable to use in combination with a platform position control arrangement such as a pair of push-pull struts 70—70 pivotally connected at their lower ends to the platform and at their upper ends to the cabinet cover as indicated at 72. The parts are of course so dimensioned and arranged that when the cabinet cover is lowered into cabinet-closing position the struts 70 will force the platform downwardly so that the appurtenances supported thereon are submerged below the level of the cabinet cover. Then, when the cover is raised to open position as shown in FIG. 2, the platform 30 will have risen to the top of the cabinet to facilitate operator-manipulations of the playing control devices. A molding strip or the like as indicated at 74 (FIGS. 1–3) may be employed to limit the upward movement of the platform to the desired level.

It is a particular feature of the mechanism of the invention that the devices thereof are so unitized and constructed as to greatly facilitate the mountings thereof inside of prefabricated cabinets, in properly positioned manner, and that final adjustments of the operational characteristics thereof may be easily made as the final step of the installation procedure. This feature of the invention derives from the fact that as best shown in FIGS. 4, 7, 9, the two apertures 80—80 provided for mounting the bottom rails against the side wall of the cabinet are of vertically slotted form, while the centrally disposed aperture 82 through the bottom rail is a simple drilled hole of a diameter substantially complementing the shank of the mounting screw. Also, as shown at FIG. 8, the apertures designated 84 at opposite ends of the upper rails 42 for receiving the mounting screws 44 are slotted in the direction of the longitudinal extent of the rail, while the intermediately disposed mounting screw aperture is shaped to substantially complement the shank of its mounting screw.

By virtue of these arrangements the installation of the units interiorly of the cabinet, and mounting of the preloaded platform on the units, and final adjustments of the counterbalance spring actions, are greatly facilitated. Furthermore, to assist in the assembly operation a special tool is provided in the form of a rod-like member 90 (FIGS. 9, 10, 11) terminating at its opposite ends in laterally bent flange portions 92, 94. The flange portion 92 is shaped so as to be hooked in slip-fitted relation through a suitably slotted botom wall portion of the top rail 42, while the opposite end flange portion 94 is shaped to slip-fit through a slotted portion of the scissors strut 38 (FIGS. 9, 10) the flange 94 being apertured as shown at 95 to accommodate a cotter pin 96 for holding the tool 90 in position. The bar 90 is length-dimensioned so as to be attachable to the unit as shown in FIGS. 9 and 10 when the unit is contracted against the action of its spring 60 whereby the unit is then in its most compact overall form. Hence, the units of the invention may be readily fabricated as complete subassemblies and locked in compacted form as shown in FIG. 9 for further transport and storage and other handling preliminary to their installation in cabinets or the like.

The control units of the invention are readily attached to the under side of the platform, and the assembly procedure is facilitated by predrilling the platform to receive the two end mounting screws 44 at their proper locations. These screws are first driven lightly. The units carrying their platforms may then be delivered to the final assembly station and are thereupon placed in the cabinets which are preferably predrilled into their side wall inner surfaces for reception of the mounting screws 49. The screws 49 are now driven lightly. The platform motion within the cabinet is then tested for possible interferences between the edges of the platform and the front and rear walls throughout the range of platform travel. If interferences occur the bottom channels 48—48 can be rotated on their center screws 49 until the path of platform travel is substantially parallel to the front and rear walls of the cabinet. This will accommodate the mechanism to production errors in the cabinet construction. Then, when the platform is determined to be traveling a proper path the screws 49 are driven snugly into holding positions.

Such adjustments of the channels 48—48 in the cabinet may undesirably displace the platform 30, either forwardly or rearwardly relative to the cabinet. This may be easily compensated for by loosening the end screws 44 on channels 42—42 and sliding the platform on the channels to locate it properly. The screws 44 are then tightened and center screws 44 are then driven in place. This provides a positive positional lock for the platform at such a position as to insure centralizing of the platform throughout the range of its travel. The molding members 74 (FIGS. 1, 2, 3) are then installed to match the plane of the platform 30 when it stands in its intended uppermost position.

The adjustment screws 68 are then turned to give the mechanism the preferred final adjustments of the counterbalancing action; it being understood that all of the operations including fastenings of the units to the cabinet side walls; adjustments of the rails to the cabinet walls and the platform relative to the parallel motion units, and adjustments of the counterbalancing action, may all be made by reaching underneath and interiorly of the cabinet through the open rear thereof.

What we claim as our invention is:

1. In a record player furniture piece of the type including a cabinet having side walls forming an open top compartment, a top cover for said compartment hingedly mounted on said cabinet, and a platform loosely fitted within said compartment and disposed horizontally therein for support of record playing and control devices, said top cover being interconnected to said platform so as to cause said platform to rise when said cover is raised and to cause said platform to lower when said cover is moved down toward cabinet-closing position;

an improved platform support and motion control mechanism comprising in combination;

a top rail of channel-sectioned form having fastener-receiving apertures therethrough elongated in the length-direction of said rail, whereby said rail may be affixed to the bottom surface of said platform in positionally adjusted relation thereunder so as to cooperate with said platform to provide a closed trackway interiorly of said rail;

a bottom rail of channel-sectioned form having fastener-receiving apertures therethrough elongated in a direction transverse to its length-dimension, whereby said bottom rail may be affixed in vertical-tilt adjusted relation to an inside vertical wall portion of the cabinet so as to cooperate therewith to provide a closed trackway interiorly of said bottom rail, first and second struts pivotally interconnected intermediately of their lengths in cross-linked manner, the upper end of said first strut being pivotally connected to one end of said upper rail, and the lower end of said second strut being pivotally connected to the corresponding end of said lower rail, the upper end of said second strut being slide-fitted through an apertured wall portion of said top rail and mounting therein a roller riding within the trackway portion thereof, and the bottom end of said first strut being slide-fitted through an apertured wall portion of said bottom rail and mounting therein a roller riding within the trackway portion thereof, whereby said mechanism is operable to maintain said platform in horizontal attitude while permitting up and down movements thereof within said cabinet, a bracket pivotally mounted on one of said struts at a position intermediate of its cross-link pivot connection and its pivot connection to one of said rails, a tension spring hooked at one end to the other of said struts and at its other end to said bracket by means connecting said spring to said bracket so as to be positionally adjustable thereto for regulating the tension effect of said spring, said spring being so arranged as to substantially counter-balance the weight of said platform and its accouterments.

2. An improved platform support and motion control mechanism as set forth in claim 1 wherein two of the relatively movable members of said mechanism are perforated to receive in slide-fitted relation opposite ends of a strut-like tool for holding the mechanism in contracted condition against the action of said spring preliminary to installation.

3. An improved platform support and motion control mechanism as set forth in claim 1 wherein said means connecting said spring to said bracket comprises a blade device constrained for slideable movement with respect to said bracket, and a machine screw, said screw bearing on said bracket and being threadably received by said blade device, whereby upon rotation of said screw said blade device is positioned with respect to said bracket to control tension of said spring.

4. An improved platform support and motion control mechanism as set forth in claim 1 wherein said upper and lower rail members also include fastener-receiving openings therethrough closely complementing the forms of the associated fastening devices for finally locking the rail members permanently in their preferred positions.

*5. In a furniture piece of the type including a cabinet having an open top compartment and a platform loosely fitted within said compartment and disposed horizontally therein;*

*an improved platform support and motion control mechanism comprising in combination:*

*a top rail adapted to be affixed to said platform;*

*a bottom rail adapted to be affixed to said cabinet;*

*first and second struts pivotally interconnected intermediately of their lengths in cross-linked manner,*

*the upper end of said first strut being pivotally connected to one end of said upper rail, and the lower end of said second strut being pivotally connected to the corresponding end of said lower rail,*

*the upper end of said second strut having means riding said top rail, and the bottom end of said first strut having means riding said bottom rail, whereby said mechanism when affixed to said platform and said cabinet as aforesaid is operable to maintain said platform in horizontal attitude while permitting up and down movements thereof within said cabinet;*

*means arranged as to substantially counter-balance the weight of said platform and its accouterments; and*

*tool means,*

*two relatively movable members of said mechanism being adapted to removably receive opposite ends of said tool means such that said mechanism may be held thereby in a contracted condition against the action of said counter-balancing means preliminary to installation of said mechanism in said cabinet.*

*6. In a furniture piece of the type including a cabinet having an open top compartment, and a platform loosely fitted within said compartment and disposed horizontally therein:*

*an improved platform support and motion control mechanism comprising in combination:*

*a top rail adapted to be affixed to said platform;*

*a bottom rail adapted to be affixed to said cabinet;*

*first and second struts pivotally interconnected intermediately of their lengths in cross-linked manner,*

*the upper end of said first strut being pivotally connected to one end of said upper rail, and the lower end of said second strut being pivotally connected to the corresponding end of said lower rail,*

*the upper end of said second strut having means riding said top rail, and the bottom end of said first strut having means riding said bottom rail, whereby said mechanism when affixed to said platform and said cabinet as aforesaid is operable to maintain said platform in horizontal attitude while permitting up and down movements thereof within said cabinet;*

*a bracket pivotally mounted on a first member of said mechanism;*

*a blade device constrained for slideable movement with respect to said bracket;*

*a screw, said screw bearing on said bracket and being threadably received by said blade device; and*

*a tension spring attached at one end to another member of said mechanism movable relative to said first member and at its other end to said blade device, whereby upon rotation of said screw said blade device is positioned with respect to said bracket to control tension of said spring,*

*said spring being so arranged as to substantially counterbalance the weight of said platform and its accouterments.*

*7. In a furniture piece of the type including a cabinet having an open top compartment and a platform loosely fitted within said compartment and disposed horizontally therein:*

*an improved platform support and motion control mechanism comprising in combination;*

*a top rail of channel-sectioned form adapted to be affixed to said platform so as to cooperate with said platform to provide a closed trackway interiorly of said rail;*

*a bottom rail of channel-sectioned form adapted to be affixed to said cabinet so as to cooperate therewith to provide a closed trackway interiorly of said bottom rail;*

*first and second struts pivotally interconnected*

*intermediately of their lengths in cross-linked manner for relative movement in spaced planes;*

*the upper end of said first strut being pivotally connected adjacent one end of said upper rail to a vertically extending flange portion thereof, and the lower end of said second strut being pivotally connected adjacent the corresponding end of said lower rail to a vertically extending flange portion thereof;*

*the upper end of said second strut being slide-fitted through an apertured horizontally extending wall portion of said top rail and mounting means riding within the trackway thereof, and the bottom end of said first strut being slide-fitted through an apertured horizontally extending wall portion of said bottom rail and mounting means riding within the trackway thereof, such that said vertically extending flange portions are disposed in horizontally spaced parallel relationship and in vertical alignment with said horizontally extending wall portions of the other of said rails whereby said struts are relatively movable within vertically disposed spaced parallel planes and said mechanism is operable to maintain said platform in horizontal attitude while permitting up and down movements thereof within said cabinet;*

*means arranged as to substantially counter-balance the weight of said platform and its accounterments; and*

*tool means,*

*two relatively movable members of said mechanism being adapted to removably receive opposite ends of said tool means such that said mechanism may be held in a contacted condition against the action of said counter-balancing means preliminary to installation of said mechanism in said cabinet, said riding means being engageable with non-apertured portions of said horizontally extending wall portions interiorly of said rails so as to prevent relative pivotal movement of said rails in opposite directions about the points at which said rails are pivotally connected to said struts when said mechanism is in contracted condition as aforesaid.*

*8. In a furniture piece of the type including a cabinet having an open top compartment, and a platform loosely fitted within said compartment and disposed horizontally therein:*

*an improved platform support and motion control mechanism comprising in combination:*

*a top rail adapted to be affixed to said platform;*

*a bottom rail adapted to be affixed to said cabinet;*

*first and second struts pivotally interconnected intermediately of their lengths in cross-linked manner,*

*the upper end of said first strut being pivotally connected to one end of said upper rail, and the lower end of said second strut being pivotally connected to the corresponding end of said lower rail,*

*the upper end of said second strut having means riding said top rail, and the bottom end of said first strut having means riding said bottom rail, whereby said mechanism when affixed to said platform and said cabinet as aforesaid is operable to maintain said platform in horizontal attitude while permitting up and down movements thereof within said cabinet;*

*means arranged as to substantially counterbalance the weight of said platform and its accouterments; and*

*means associated with at least one of said rails for vertical-tilt adjustment of said platform within said cabinet.*

*9. In a furniture piece of the type including a cabinet having an open top compartment and a platform loosely fitted within said compartment and disposed horizontally therein:*

*an improved platform support and motion control mechanism comprising in combination:*

*a top rail adapted to be affixed to said platform;*

*a bottom rail adapted to be affixed to said cabinet;*

*first and second struts pivotally interconnected intermediately of their lengths in cross-linked manner,*

*the upper end of said first strut being pivotally connected to one end of said upper rail, and the lower end of said second strut being pivotally connected to the corresponding end of said lower rail,*

*the upper end of said second strut having means riding said top rail, and the bottom end of said first strut having means riding said bottom rail, whereby said mechanism when affixed to said platform and said cabinet as aforesaid is operable to maintain said platform in horizontal attitude while permitting up and down movements thereof within said cabinet; and*

*spring means arranged so as to substantially counter-balance the weight of said platform and its accouterments, said spring means including adjustment means mounted on a first member of said mechanism, and a spring attached at one end to said adjustment means and at another end thereof to another member of said mechanism movable relative to the first said member.*

References Cited

The following references, cited by the Examiner, are of record in the patented file of this patent or the original patent.

UNITED STATES PATENTS

| | | | |
|---|---|---|---|
| 1,193,417 | 8/1916 | Pauls | 108—145 X |
| 1,352,352 | 9/1920 | Caswell | 108—145 X |
| 2,527,407 | 10/1950 | Dunn | 312—23 |
| 2,769,678 | 11/1956 | Wolters | 312—272.5 |
| 2,790,887 | 4/1957 | Gelfand | 312—24 X |
| 2,812,226 | 11/1957 | Wolters | 312—272.5 |
| 3,080,066 | 3/1963 | Berridge et al. | 312—312 X |
| 3,301,952 | 1/1967 | Reznik | 312—8 |

FOREIGN PATENTS

| | | | |
|---|---|---|---|
| 742,071 | 12/1955 | Great Britain | 312—272.5 |
| 30,343 | 1/1926 | France | 248—399 |
| 479,041 | 3/1953 | Italy | 248—399 |

JAMES T. McCALL, Primary Examiner

U.S. Cl. X.R.

312—8, 20